United States Patent [19]
Rhine

[11] Patent Number: 5,283,431
[45] Date of Patent: Feb. 1, 1994

[54] OPTICAL KEY SECURITY ACCESS SYSTEM

[76] Inventor: Raymond J. Rhine, 7302 N. Heathcliff Ave., Tuscon, Ariz. 85741

[21] Appl. No.: 830,926

[22] Filed: Feb. 4, 1992

[51] Int. Cl.⁵ .......................... G06K 7/10; G03H 1/26
[52] U.S. Cl. ..................................... 250/229; 235/382; 235/487
[58] Field of Search ................. 250/221, 229, 556; 235/382, 457, 460, 487; 340/825.31, 825.34; 70/DIG. 51, 277

[56] References Cited

U.S. PATENT DOCUMENTS

| | | | |
|---|---|---|---|
| 3,797,936 | 3/1974 | Dimitriadis | 356/71 |
| 4,189,712 | 2/1980 | Lemelson | 235/382 |
| 4,257,030 | 3/1981 | Bruhin et al. | 235/382 |
| 4,837,425 | 6/1989 | Edwards | 235/382 |
| 4,853,524 | 8/1989 | Yamaguchi et al. | 235/454 |
| 5,043,593 | 8/1991 | Tsutsumi et al. | 250/229 |

*Primary Examiner*—David C. Nelms
*Assistant Examiner*—S. B. Allen
*Attorney, Agent, or Firm*—S. Michael Bender

[57] ABSTRACT

An access security system employs a non-duplicatable key made from an optically transmissive material having gradient refractive index and diffusive properties which provide the material with a non-duplicatable quality. The system provides a high level of security comparable to many biometric systems and is well suited for use in the prevention of unauthorized access to high security areas.

5 Claims, 4 Drawing Sheets

OPTICAL KEY SECURITY ACCESS SYSTEM

BACKGROUND OF THE INVENTION

1. Field of the Invention

The present invention relates to access control systems, and more particularly pertains to a system utilizing optically readable key units.

2. Description of the Prior Art

Many of the shortcomings of existing access systems are related to the ease of duplication of keys or magnetic cards which provide access. Even elaborate systems utilizing fingerprint or retinal imaging can be circumvented by a clever hacker. Although no system can provide 100% security, all systems have various levels of security rated in estimated man hours to defeat the particular system. The higher the complexity of a system, the higher the access security as well as the cost. Electro-optical security systems represent one of the better known types having a high degree of complexity which thus results in a comparable degree of difficulty to circumvent. These systems are employed more frequently than fingerprint or retinal imaging, and cost substantially less to install and utilize. Accordingly, electro-optical security systems provide the most promise for improvement at minimal cost while increasing the level of difficulty associated with circumvention.

A typical example of an electro-optical lock system is to be found in U.S. Pat. No. 3,885,408 which issued to Charles Clark, Jr. on May 27, 1975. This patent discloses a finger operated electro-optical lock system in which an optical keyboard having at least one zone indicated thereon is illuminated by ambient energy until touched by the finger of a human hand, thereby blocking the radiant energy passing through the zone. A counter is then enabled to cycle a numeric display and when the first digit of the combination appears in the display, the finger is lifted and reapplied until the second digit of the combination is displayed. While being functional for its intended purpose, this system makes no use of a hand held key or magnetic card and thus requires the user to memorize the combination.

A more recent example of an optical key system is to be found in U.S. Pat. No. 4,079,605 which issued to Vernon Bartels on Mar. 21, 1978. The Bartel's patent is directed to an optical key reader for door locks and employs an optical scanning means for detecting a code pattern on a key unit. The detected code is compared by a comparator having a predetermined code which is stored in a reader, and if a match is found in this comparison, the comparator generates an actuation signal to allow access through a door. This type of system is the most desirable for seeking improvement since such improvement could possibly be accomplished at a minimum cost and accordingly there exists a continuing need for such improvements to provide greater access security. In this respect, the present invention substantially fulfills this need.

SUMMARY OF THE INVENTION

In view of the foregoing disadvantages inherent in the known types of security access systems now present in the prior art, the present invention provides an improved security access system which utilizes gradient refractive materials in an access key. As such, the general purpose of the present invention, which will be described subsequently in greater detail, is to provide a new and improved security access system which has all the advantages of the prior art security access systems and none of the disadvantages.

As can be appreciated, security systems have become increasingly complex over the years, incorporating more and more of the rapid technological advances being made in a number of research areas. Unfortunately, the efforts of those who seek to overcome security systems have also become more advanced, thereby necessitating a continuing level of development in systems designed to protect property and security. The crypto optics system comprising the present invention represents one of the newest, best and most cost-effective responses made on the side of security systems.

The crypto optics system comprising the present invention incorporates advances made in computers, optics, plastics and electronics. It basically consists of a non-duplicatable key having five separate encoded segments, and a tamperproof computerized system that reads the optical information encoded in the key. The key is made from ferromagnetic material shaped to provide a protective housing for the five key segments. The segments are manufactured from an optically transmissible material (plastic or glass) with gradient refractive index and diffusive properties which bend light in ways that cannot be duplicated by conventional materials. The use of five different segments on a key allows an estimated minimum of 40,000,000 key combinations.

More specifically, the crypto optics system uses a simple, yet sophisticated imaging system to detect the patterns of various infrared beams that are passed through the five different segments of the optically encoded material in the key when it is inserted in a "cryptolock." A two-dimensional imaging array consisting of 1,000 or more photosensitive elements examines the five modules on the key. The signals are then relayed electronically to a microprocessor controller that determines if the proper key has been inserted into the lock. If the computer chip controlling the detection system matches the key's pattern with the security code placed in its memory, it sends out a signal to trigger an unlocking mechanism. If the code does not match, the system remains locked and an alarm can be sent to a main security system to indicate tampering, repeated access denial, or an internal fail condition.

The crypto optics system provides a level of security comparable to many biometric systems, such as retinal imaging or fingerprint identification systems. It provides a high level of security for minimal cost compared with other systems of the same security level. Further, the keys can be manufactured for various performance levels, using differing numbers of optically coded segments. Its use would be appropriate for preventing unauthorized access to high security areas, either military or industrial. In a less expensive, limited form, the crypto optic system is also appropriate for use in car door alarms and home security systems. Owing to its level of sophistication and complexity, it would most likely be sold by security specialists who serve military and corporate customers. In a less expensive, simpler form, it would be sold by locksmiths and automotive security system suppliers. There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way. It is therefore an object of the present invention to provide a new and improved security access system which has all the advantages of the prior art security access systems and none of the disadvantages.

It is another object of the present invention to provide a new and improved security access system which may be easily and efficiently manufactured and marketed.

It is a further object of the present invention to provide a new and improved security access system which is of a durable and reliable construction.

An even further object of the present invention is to provide a new and improved security access system which is susceptible of a low cost of manufacture with regard to both materials and labor, and which accordingly is then susceptible of low prices of sale to the consuming public, thereby making such security access systems economically available to the buying public.

Still yet another object of the present invention is to provide a new and improved security access system which provides in the apparatuses and methods of the prior art some of the advantages thereof, while simultaneously overcoming some of the disadvantages normally associated therewith.

Still another object of the present invention is to provide a new and improved security access system which utilizes gradient refractive materials in a key divided into segments imaged on a CCD array used as a security access system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
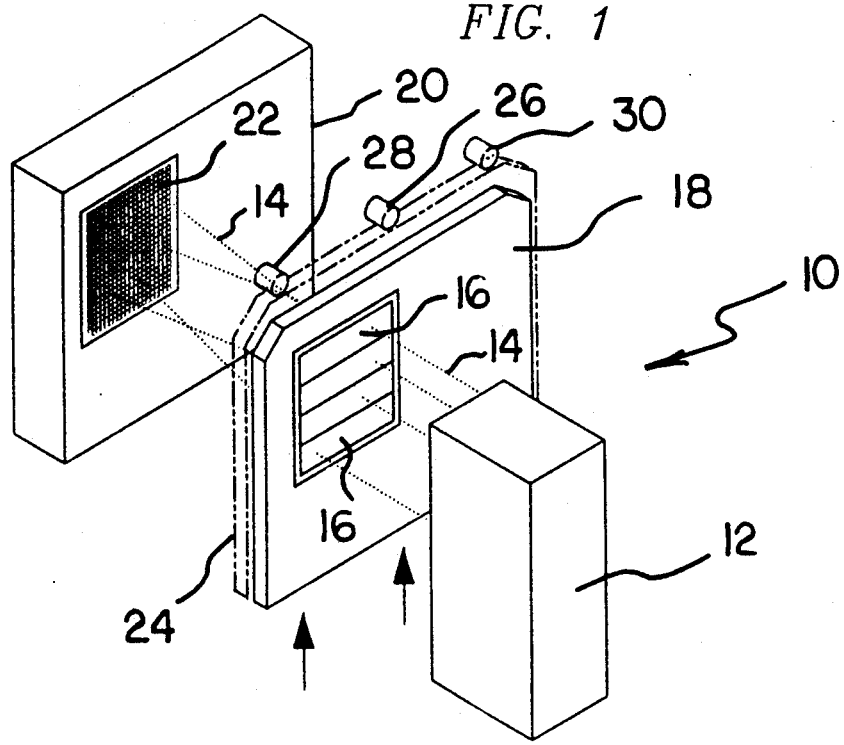
FIG. 1 is a schematic representation of the basic concept of the present invention.
Figure 1A:
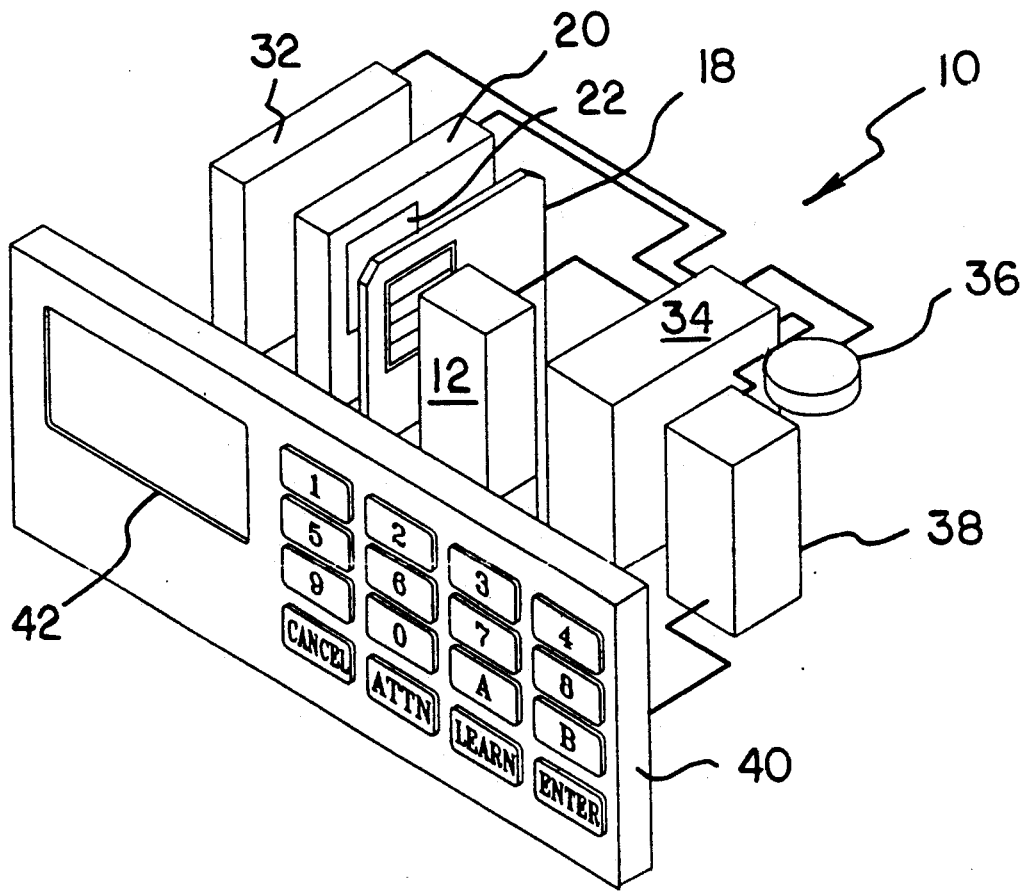
FIG. 1A is a schematic representation of a complete embodiment of the present invention.

With reference now to the drawings, and in particular to FIGS. 1 and 1A thereof, a new and improved crypto optic system embodying the principles and concepts of the present invention and generally designated by the reference numeral 10 will be described.

More specifically, it will be noted that the present invention 10 overcomes many of the shortcomings of existing security access systems by the utilization of gradient refractive index glasses or plastics (G.R.I.N). This material bends light beams in a way that conventional materials ca not duplicate. By using a simple imaging system to detect the patterns of the various infrared light beams that pass through the different segments of the G.R.I.N. material, a high level of access security is provided at a minimal cost compared to other systems of the same security level.

FIGS. 1 and 1A clearly illustrate the basic operating components of the invention 10. In this regard, an optical beam source 12 comprises a plurality of infrared light beams (similar to laser diodes or light emitting diodes) which are collimated before passing through apertures having diameters of one millimeter or less. The number of infrared beams, all of which are generally designated by the reference numeral 14, are dependent upon the number of key segments which are all generally designated by the reference numeral 16 and which will be described subsequently in greater detail. The beam sources 14 are comparable to the infrared beam source utilized in a compact disk player.

A key housing 18, which might resemble a conventional key, a magnetic access card, or the like, is constructed from a ferromagnetic material and is shaped to provide a protective housing for the aforementioned key segments 16 as well as for ease of insertion into a lock housing. The selected shape allows for repeatability of alignment with the beam sources 14 and an imaging array 20. The imaging array 20 comprises a two dimensional array of at least 1,000 or more photo-sensitive elements, all of which are generally designated by the reference numeral 22.

With continuing reference to FIGS. 1 and 1A of the drawings, the optical segments 16 retained within the key housing 18 are formed from a gradient refractive index material (G.R.I.N.) having refractive and diffusive properties to distort and reorient light beam paths from the beam source 12. The individual G.R.I.N. segments 16 are positioned adjacent to the light beams and their attendant source 14 in a manner whereby the light beams from the beam source 12 are aligned to impinge upon the G.R.I.N. segments after which the beams are deviated to impinge upon the aforementioned imaging array 20. In the preferred embodiment, the imaging array 20 can comprise a charge coupled device (CCD) or photodiode array.

The broken line 24 represents a receiving slot for the key 18 and includes a permanent magnet fixedly secured to a bottom end thereof. Additionally, a pair of hall effect devices 28, 30 are secured to a bottom end of the key receiving slot 24. The magnet 26 is used to provide magnetic flux which is conducted through the key 18 when it comes into contact with the bottom of the lock housing, and this flux is then conducted through the key to the hall effect detectors 28, 30. The hall effect devices 28, 30 comprise semiconductors which are capable of detecting a magnetic field and as is now apparent, they can be used to detect the presence of an appropriate key 18.

The imaging array 20 is operably controlled by conventional array electronics 32. The array electronics 32 include the circuits necessary for operating the imaging array 20 and also for interfacing buffered signals to a computer interface. The computer interface comprises a microprocessor controller 34 which is effectively a general purpose controller having the necessary quantities of ROM, RAM and control logic to support the lock system. An alarm output 36 may be used to signal a main security system under conditions indicative of tampering, vandalism, repeated access denial, or an internal failed condition. This signal should be coded to match the main security system, and may or may not be fiber optically coupled to thwart line tampering.

An access enable output 38 is also coupled to the microprocessor 34 and provides the signal for triggering the locking or unlocking of an electro-mechanism. This signal also may or may not be coded or fiber optically coupled.

Also shown coupled to the microprocessor controller 34 is a conventional keypad 40. The keypad 40 is of a conventional construction and provides all of the well known general purpose functions. The push button, matrix-type keypad 40 would be environmentally suited to a security locked application, and such keypads are already known in the prior art as previously discussed. The microprocessor controller 34 would also be provided with a conventional alphanumeric type display 42, and such display could comprise a conventional computer monitor which could be backlit with ten to N characters.

Figure 2:
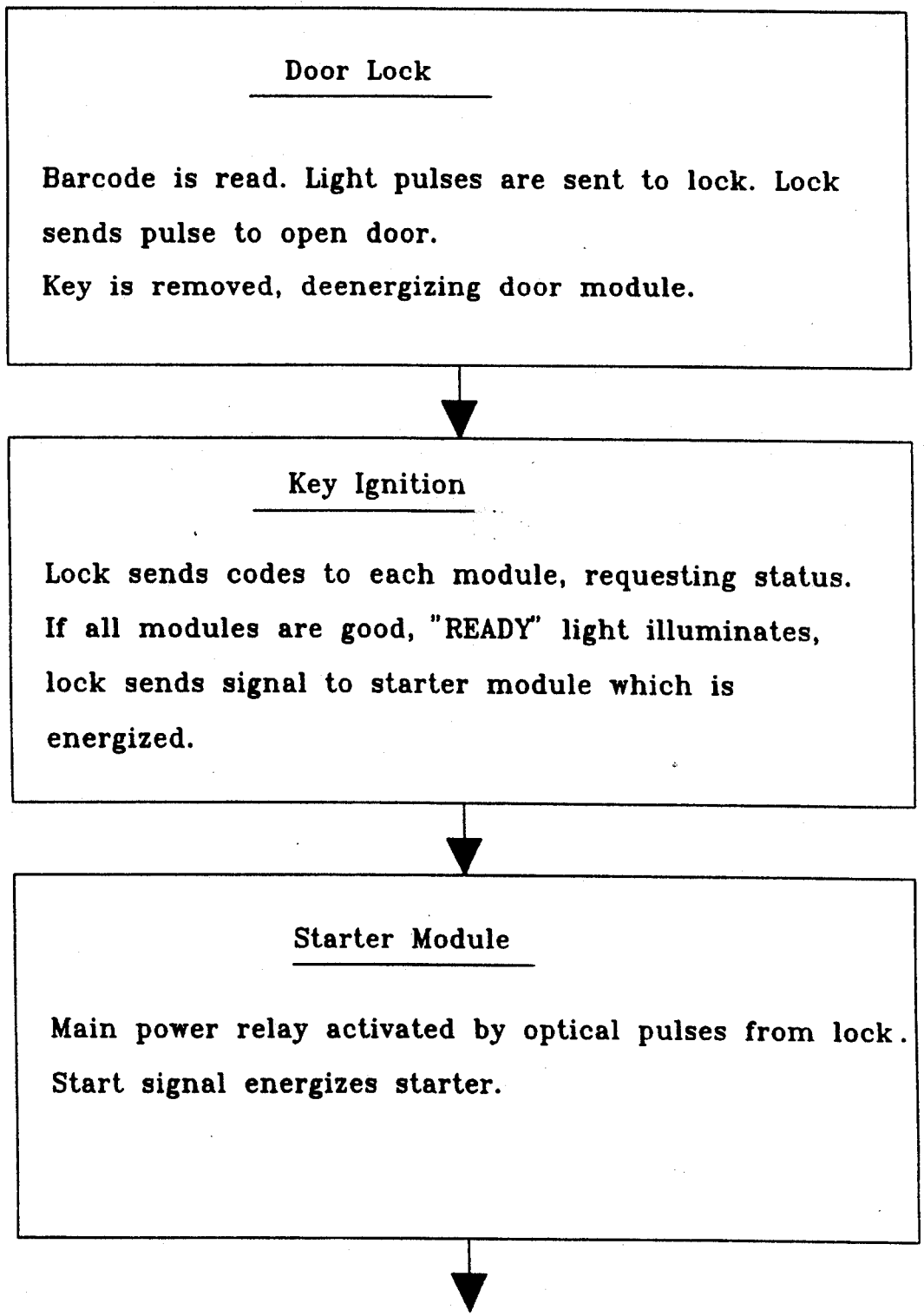
FIG. 2 is a first part of a flow diagram illustrating one manner of operation of the present invention.
Figure 3:
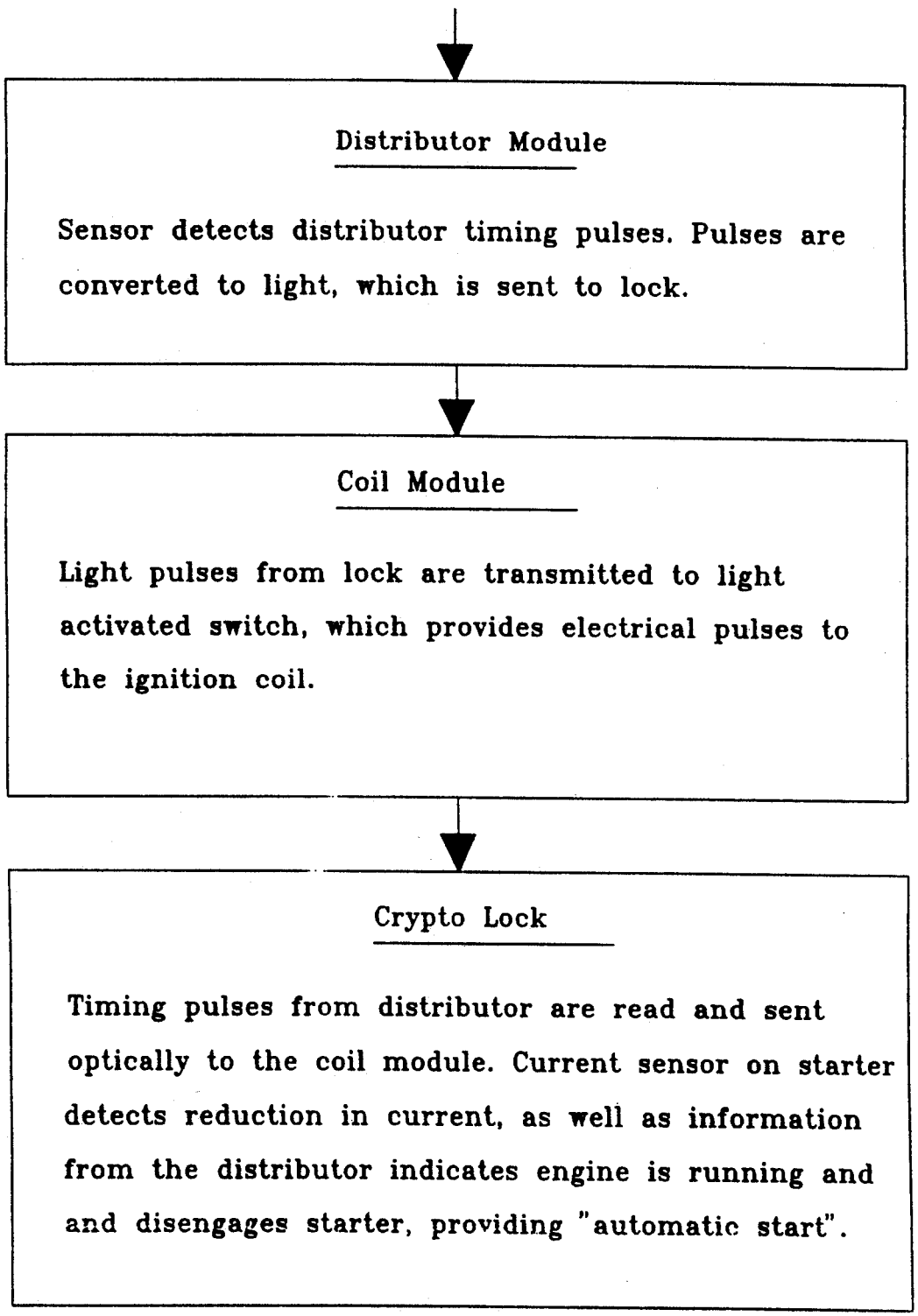
FIG. 3 is a second part of the flow diagram illustrated in FIG. 2.
Figure 4:
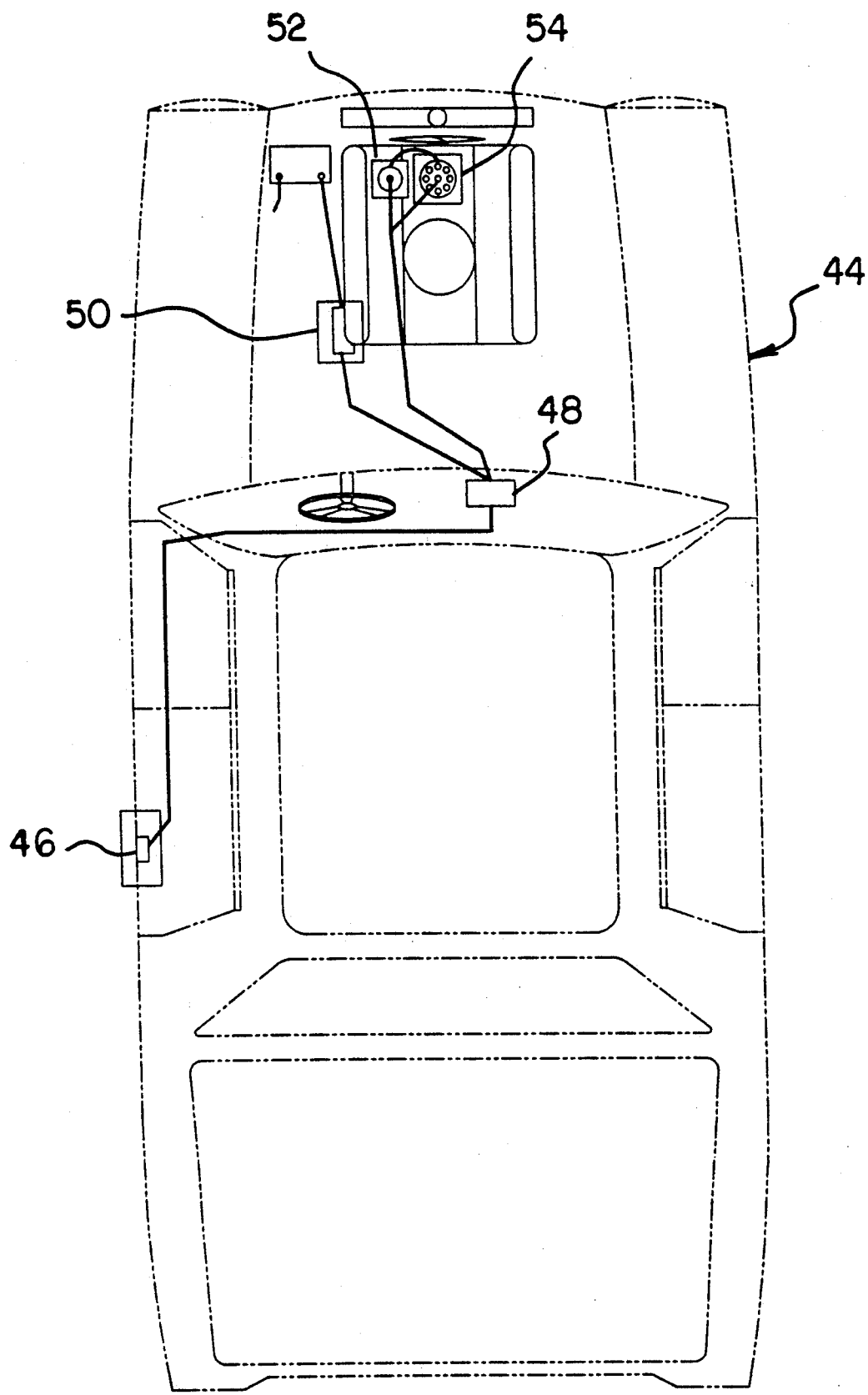
FIG. 4 is a schematic representation illustrating a manner of use of the present invention.

FIGS. 2, 3 and 4 illustrate a typical use of the present invention 10. In this respect, the invention is employed in use as a laser ignition lock for an automotive vehicle. As shown in FIG. 4, a vehicle 44 includes a door lock module 46 designed to receive a standard vehicle door key. The key would have a bar code manufactured in silver on a top portion thereof, and it is envisioned that different keys could be provided for various performance levels. For example, limited vehicle performance (such as speed control) could be controlled by one key so as to obtain high economy, while high performance and standard economy could be provided by a different key.

In operation, the door lock 46 would read the barcode provided on the vehicle door-opening key, and light pulses would then be sent to a "crypto" lock 48. The crypto lock 48 would send a pulse to open the door, and the key would then be removed so as to deenergize the door module 46.

The key would then be inserted into the crypto lock 48, which effectively comprises the ignition, and the lock would send status request codes to a starter module 50, a coil module 52 and a distributor module 54. If the modules 50, 52, 54 are all good, a "READY" light illuminates and the lock 48 then sends a signal to the starter 50 whereby the starter solenoid is enabled. In this regard, the main power relay associated with the starter module 50 is activated by optical pulses from the lock 48, and the attendant start signal energizes the starter solenoid.

Once the starter module 50 has activated the starter solenoid, a sensor on the distributor module 54 detects the distributor timing pulses, and these pulses are converted to light which is then sent to the lock 48. Light pulses from the lock 48 are then transmitted to a light activated switch in the coil module 52, and this switch provides electrical pulses to the ignition coil. After timing pulses from the distributor are read and sent optically to the coil module, a current sensor on the starter detects reduction in electrical current, as well as information from the distributor which indicates the engine is running. The crypto lock 48 then disengages the starter so as to provide an "automatic start" function.

Optional features can also be provided with the system 10. For example, an optional holographic transmissive gradient can be positioned between the activating key and its associated detector so as to produce preselected interference patterns from the infrared beams. This, of course, increases the complexity of the optical code read from the CCD array. Further, an optional fiber optic link can be provided wherein an optical fiber is used to separate the basic optical system (emitter and detector assembly) from the processing electronics to reduce the possibility of tampering. An anti-tampering function is already provided through the use of random pulses of 100 nanosecond light pulses delivered from the crypto lock 48 and echoed by the modules 46, 50, 52, 54 with a built in delay. The lock 48 looks for missing pulses and can be utilized to activate either a silent or audible alarm.

In summary, the basic operation of the present invention will be the same regardless of the functional use to which it is employed. In every case, infrared light beams from one to N number of sources (laser or light emitting diode) is collimated before passing through many small apertures (one millimeter or smaller). In each case, the collimated light will then pass through the stacked segments of the G.R.I.N. glass, and the light exiting the stacked segments will then impinge on the CCD imaging array containing a minimum of one thousand pixel elements. This in effect comprises the preferred construction of the optical portion of the invention in most cases.

Similarly, regardless of the functional use, the optical segments of a key will be encompassed by a ferromagnetic material so that when a key is inserted into the system, magnetic material at the bottom of the lock assembly will draw the key into register with the previously described hall effect detectors. At the bottom of the lock assembly, flux from the magnet will travel through the ferromagnetic material activating the two hall effect detectors, and the output from the hall detectors, being "coincident" within milliseconds, causes the microprocessor system to be activated. The activated microprocessor goes through a self check verifying system integrity and next the infrared light beam sources are energized. Collimated light beams from the sources propagate through the key to the detector producing an output in the CCD detector. The detector is read in frame format, and data which is fed out serially from the detector is averaged. The averaged data is then compared to key codes stored in an E to the second power ROM. When a match is made, access is granted. The processor stores information on what key accessed the system, along with the time and the interval. This information is stored in a temporary register so that the data can be recovered at a later time.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved optical key security access system comprising:
    photo-sensitive means for receiving and detecting at least one light beam, said photo-sensitive means comprising a two-dimensional imaging array;
    illumination means for sending at least one light beam to said imaging array; and
    key means positionable between said illumination means and said imaging array, said key means including an integral material through which said at least one light beam passes, said integral material serving to reorient said at least one light beam whereby said integral material causes said light beam to impinge upon a preselected portion of said imaging array, said integral material comprising optically transmissive gradient refractive index material for reorienting said at least one light beam to impinge upon a preselected portion of said imaging array, and signal processing means responsive to the output of said imaging array to compare a signal representing said preselected portion of said imaging array with a predetermined encoded signal.

2. The new and improved security access system as described in claim 1, wherein said illumination means comprises a plurality of infrared light beams.

3. The new and improved security access system as described in claim 2, wherein said plurality of infrared light beams are collimated prior to passing through said gradient refractive index material, said plurality of infrared light beams being diffused and reoriented upon passing through said gradient refractive index material, thereby to impinge upon preselected portions of said imaging array.

4. The new and improved security access system as described in claim 3, wherein said key means is formed of a ferromagnetic material, said gradient refractive index material being mounted within said ferromagnetic material.

5. The new and improved optical key security access system as described in claim 4, and further including magnet means mounted in a key means receiving lock, said magnet means serving to pull said key means into register with at least one hall effect detector, said at least one hall effect detector adapted to produce a signal output utilizable to operate said signal processing means.

* * * * *